June 27, 1933.   F. R. McGEE   1,915,744
VALVE
Filed Feb. 23, 1932   2 Sheets-Sheet 1
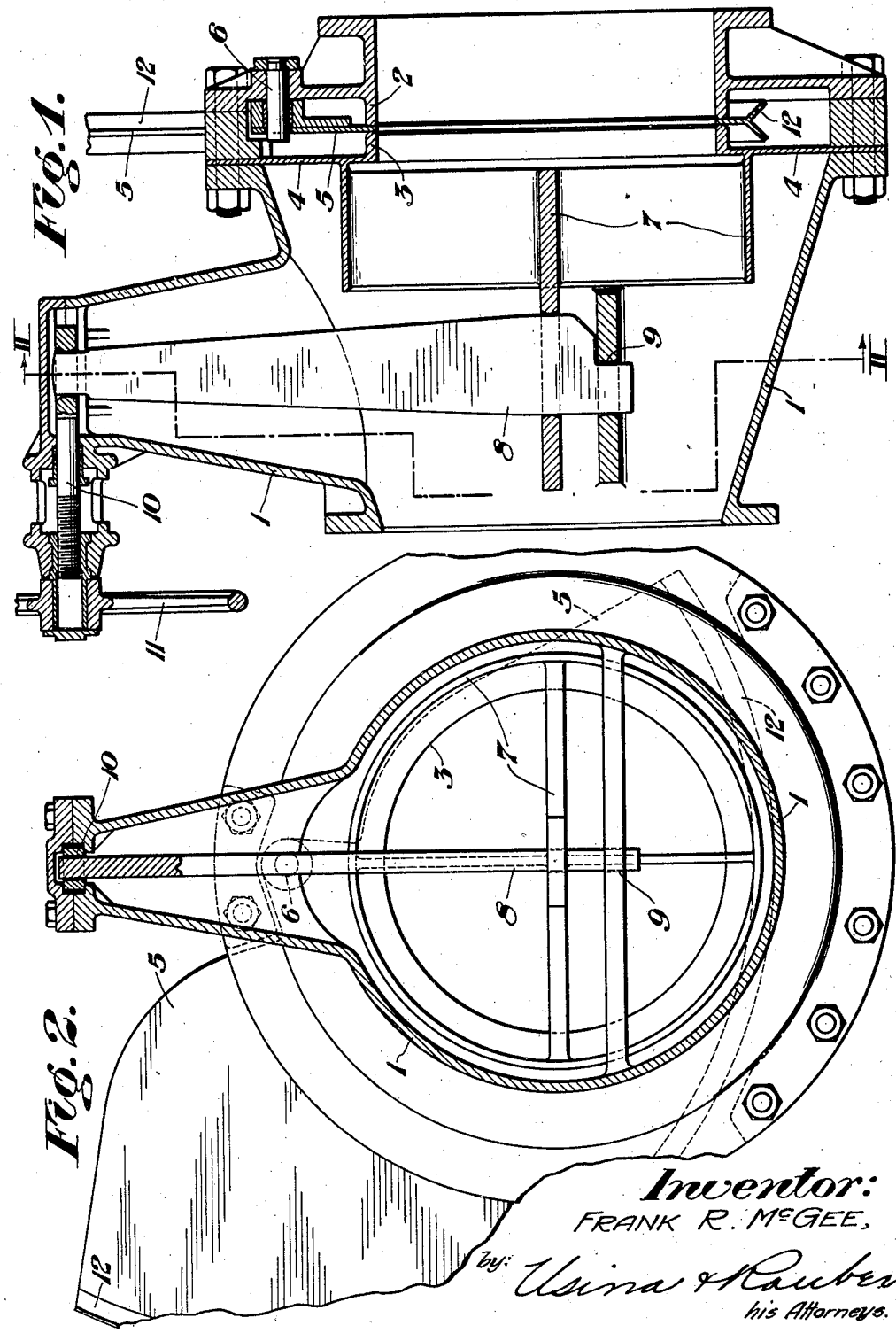
Inventor:
FRANK R. McGEE,
by Usina & Rauber
his Attorneys.

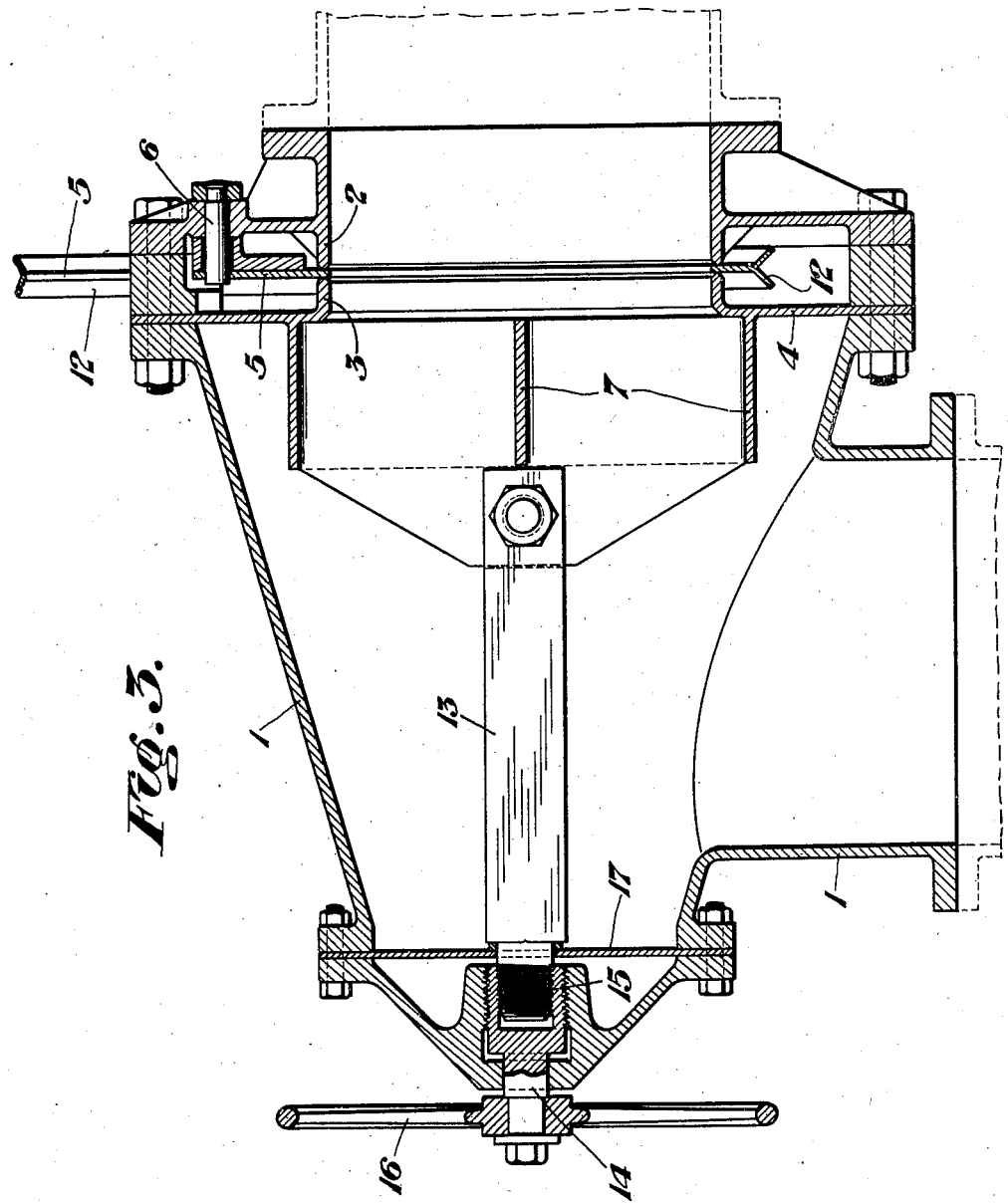

Patented June 27, 1933

1,915,744

UNITED STATES PATENT OFFICE

FRANK R. McGEE, OF STEUBENVILLE, OHIO

VALVE

Application filed February 23, 1932. Serial No. 594,665.

This invention relates to valves and particularly to gas valves such as are ued to handle relatively large volumes of gases. One type of valve customarily used consists simply of a metal plate which is shoved between two sections of the pipe conducting the gases and bolted in place. Generally this plate is made goggle-shaped with an open and blind eye, the blind eye being bolted in place as just mentioned and the open eye being substituted when the valve is open. These valves are subject to the disadvantage that they are easily rendered inoperative by the rusting and locking together of the various bolts, journals and sliding surfaces and require extra supports in the gas mains.

The valve embodied by the present invention is intended to obviate the above mentioned objectionable features. Further, it is to be capable of being operated much more quickly, which is a great advantage, for instance, when handling blast furnace gases. Other attainments of the invention will be understood from the following disclosure.

Having reference to the accompanying drawings, which illustrate two specific forms of the invention:

Figure 1 is a vertical cross-section of a straightway form.

Figure 2 is a cross-section from the line II—II in the first figure.

Figure 3 is a vertical cross-section of an angle form.

The straightway valve will be described first.

A casing 1 has a fixed gas conducting section 2 and a second similarly shaped section 3 which opposes the first and is mounted on a flat annular ring 4 of flexible material. A plate 5 is mounted on a pivot 6 for swinging movement between the two sections. Both surfaces of this plate adjacent its inner circumference and the edges of the two sections are ground smoothly.

A spider ring 7 is fixed to the ring 4 adjacent the section 3. The casing 1 extends upwardly to accommodate the long end of a one-arm lever 8 which is fulcrumed in a socket 9 and fits through a hole in the spider 7. The upper end of this lever is fixed to a shaft 10 which projects out through the casing 1 with which it is in screw-threaded relationship. The various parts through which this lever projects have rounded surfaces which insure free operation. The shaft 10 is operated by a hand wheel 11 in the present instance, although in large valves it may be found advantageous to use some sort of power drive.

The operation of the valve is fairly obvious. Rotation of the shaft 10 in one direction will move the section 3 away from the section 2 permitting movement of the plate 5. When this plate is in closed position it will be hugged on either side by the two sections in a gas-tight manner. When the plate is withdrawn so that the valve is open the two sections are shoved together so that their ground edges coact whereby a gas-tight conduit is formed. As the plate 5 will be relatively unsupported when the valve is open it is preferably provided with a peripheral reenforcement 12.

The angle valve differs from the just described straightway valve in its spider ring operating mechanism only. Here the mechanism consists simply of a rod 13 which is fixed to the spider 7 and projects back towards the end of the casing 1, the latter being modified only to the extent that the gases are directed right-angularly instead of straight and the upwardly projecting part of the casing shown in the first instance for accommodation of the lever 8 is, of course, eliminated.

This rod 13 is operated by a shaft 14 through a compound screw 15. The shaft 14 is manually operated by a hand wheel 16 although, as previously mentioned, a power drive motor may prove more suitable in some instances. The compound screw 15 is protected from scum or other gas contamination by a diaphragm 17 interposed between it and the rod 13. The operation of this angle valve is substantially similar to that described in connection with the straightway valve.

Although specific forms of this valve have been shown and described in accordance with the patent statutes, it is not intended to limit the scope of the invention exactly thereto, except as defined by the following claims.

I claim:

1. A valve including a casing, a fixed gas conducting section in said casing, a movable gas conducting section positioned in said casing to oppose said fixed section, a plate arranged for swinging movement between said sections, a spider arranged in said casing and connected with said movable section, and means for moving said spider to operate said movable section.

2. A valve including a casing, a fixed gas conducting section in said casing, a movable gas conducting section positioned in said casing to oppose said fixed section, a plate arranged for swinging movement between said sections, a spider arranged in said casing and connected with said movable section, a lever arranged in said casing and connected with said spider and a shaft fixed to said lever and projecting through said casing, said shaft and casing being arranged in mutual screw-threaded engagement.

3. A valve including a casing, a fixed gas conducting section in said casing, a movable gas conducting section positioned in said casing to oppose said fixed section, a plate arranged for swinging movement between said sections, a spider arranged in said casing and connected with said movable section, a rod fixed to said spider, a shaft projecting through said casing and a compound screw connection between said shaft and rod.

4. A valve including a casing, a fixed gas conducting section in said casing, a movable gas conducting section in said casing, a flat ring of flexible material carrying said movable section so as to oppose said fixed section, a plate arranged to swing between said sections, a spider fixed to said ring adjacent said movable section and means for moving said spider.

5. A valve including a casing, a fixed gas conducting section in said casing, a movable gas conducting section in said casing, a flat ring of flexible material carrying said movable section so as to oppose said fixed section, a plate arranged to swing between said sections, a spider fixed to said ring adjacent said movable section, a lever arranged in said casing to move said spider, and an outwardly projecting shaft arranged in screw-threaded engagement with said casing and fixed to said lever.

6. A valve including a casing, a fixed gas conducting section in said casing, a movable gas conducting section in said casing, a flat ring of flexible material carrying said movable section so as to oppose said fixed section, a plate arranged to swing between said sections, a spider fixed to said ring adjacent said movable section, a rod fixed to said spider, a shaft projecting through said casing and a compound screw connection between said shaft and rod.

In testimony whereof, I have hereunto set my hand.

FRANK R. McGEE.